May 18, 1954     E. W. REINSCH     2,678,731
SEPARATOR

Filed March 7, 1951     2 Sheets-Sheet 1

INVENTOR
EARL W. REINSCH
BY
HIS ATTORNEYS

May 18, 1954     E. W. REINSCH     2,678,731
SEPARATOR

Filed March 7, 1951     2 Sheets-Sheet 2

INVENTOR.
EARL W. REINSCH

Patented May 18, 1954

2,678,731

UNITED STATES PATENT OFFICE 2,678,731

SEPARATOR

Earl W. Reinsch, Dayton, Ohio, assignor to General Motors Corporation, Detroit, Mich., a corporation of Delaware Application March 7, 1951, Serial No. 214,413

6 Claims. (Cl. 210—57)

This invention relates to separators and is particularly concerned with an apparatus for separating solid particles of dirt and the like from a fluid medium.

It is therefore, one object of the invention to provide a separator for removing extraneous solid matter from a fluid medium, such as dirt from oil. In carrying out this object, it is a further object to utilize a centrifugal principle for causing the dirt to be segregated and positively located with respect to a stream of dirty oil whereby the dirt may be removed from the oil.

Another object of the invention is to provide an oil cleaner for use in connection with an internal combustion engine wherein the cleaner is of the full flow type and wherein the dirty oil from the crankcase of the engine is forced through the cleaner under pressure and the dirt is removed therefrom centrifugally and collected in a settling tank while the clean oil is recirculated through the engine.

In carrying out the above object, it is a still further object to provide a vertical separator including an elongate annular passage having an inlet at the lower end thereof and an outlet at the upper end and including an upwardly extending spiral groove at the outer wall of the annular passage wherein the area at the root diameter of the groove is less than the area at the open end thereof. A tangentially disposed duct is provided at the upper end of the groove whereby dirt, which has been centrifugally thrown into the groove and circulated therearound, is removed through said duct and wherein the main flow of the oil passes through the outlet of the separator.

Further objects and advantages of the present invention will be apparent from the following description, reference being had to the accompanying drawings, wherein preferred embodiments of the present invention are clearly shown.

In the separation of extraneous material from fluids, such as dirt in the oil and the like, there have been many types of separators and filters proposed to carry out the function, particularly in connection with internal combustion engines. The majority of these separators are not of the full flow type, that is to say, they are what may be termed bypass filters or separators. In a bypass separator only a portion of the oil passes therethrough and the dirt is removed therefrom while the clean oil is recirculated into the system. This type of separator is used since it is commercially impossible to provide a filter type cleaner which will not have increasingly greater pressure drop therethrough as the removed dirt builds up on the filter element.

It is apparent that in an internal combustion engine, for example, where a lubricant is circulated under pressure, that if an ever-increasing pressure drop is introduced in the filter element, eventually the engine will be starved for lubrication if a full flow type of filter is utilized, thus causing engine failure. For this reason, therefore, a bypass type of filter has always been used. In this connection, it is apparent that the cleaning of the oil is not of an efficient nature since as the bypass filter increases in pressure drop, less and less oil passes therethrough until finally the filter passes substantially no oil with the result that the dirty oil is recirculated through the engine.

For these reasons, it is manifest that a full flow separator is highly desirable, provided that such a separator can be used which has a very low pressure drop therethrough and which does not build up resistance toward fluid flow during use.

Figure 2:
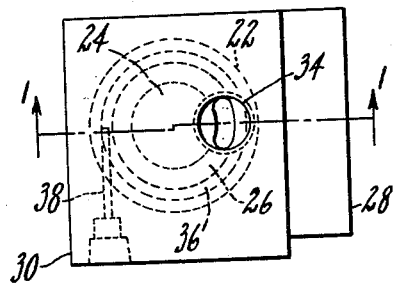
Fig. 2 is a top view of the separator shown in Fig. 1.
Figure 1:
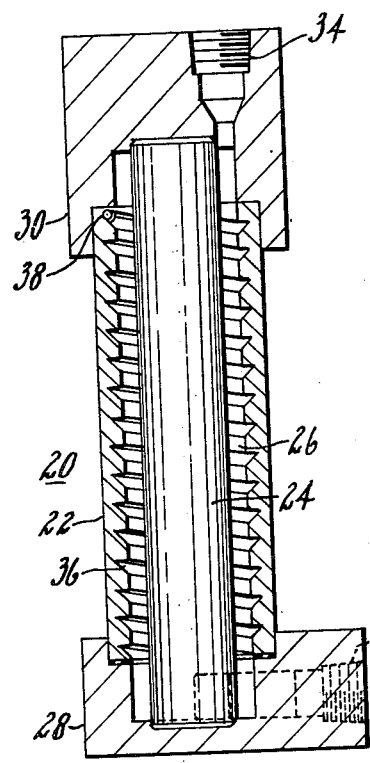
Fig. 1 is a cross sectional view of a preferred type of oil separator as taken on line 1—1 of Fig. 2.
Figure 3:
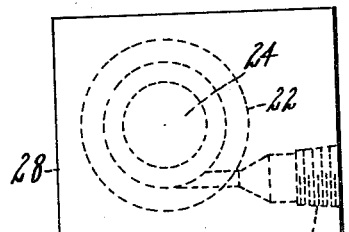
Fig. 3 is a bottom view of the separator shown in Fig. 1.

The separator, as shown in Fig. 1 at 20, is such a device. The separator includes an elongate vertical body portion 22 having an elongate vertical core 24 therethrough of less diameter than the inner diameter of the body portion 22 whereby an elongate vertical annular passage is provided between the parts 22 and 24. The width of this passage is sufficient to provide full flow without appreciable pressure drop. The body portion 22 is maintained between two end blocks 28 and 30 which include an inlet 32 and an outlet 34 respectively, threaded to engage tubing connections in the oil line. It will be noted that the inlet 32 enters the channel or passage 26 tangentially as shown in Fig. 3 so as to cause a swirling motion in the oil as it passes upwardly under pressure. Similarly the outlet 34 is taken off at one side to enhance this function.

In order to provide means for collecting dirt, a spiral groove 36 is cut in the wall of the body 22 adjacent the outer wall of passage 26. This groove 36 spirals upwardly from the bottom of the passage 26 to the top thereof. It will be noted that the cross section of the groove 36 is of a substantially triangular shape with the smallest area portion, or the apex, at the root diameter of the groove. This design is adhered to for the purpose of concentrating any dirt, which is accumulated in the groove, into the apex of the triangular cross section groove. It will be seen that as dirty oil enters the passage 26, it is swirled due to the tangential entry thereof, thereby causing centrifugal force to act on dirt particles therein since said dirt particles have a greater density than the density of the oil. This tends to throw the particles outwardly whereupon they impinge upon the walls of the passage 26 and eventually become engaged in the groove 36 where they are held by centrifugal force and are progressively moved upwardly by the swirling motion of the main body of the oil. The width and length of the passage 26 is sufficient and is calculated to permit an average size particle of dirt having an average density of a dirt particle to be separated to migrate from the inner wall of passage 26 into the groove 36 during the time that any single vertical increment of the oil remains within the separator. This may be calculated in view of the distance, the density and the velocity of the oil as it passes through the separator.

The pitch of the spiral 36 should be calculated so as to be greater than the natural pitch of the spiralling fluid as determined by the cross section and length of the annular passage 26 and the initial inlet velocity of the fluid.

In order to remove this dirt, the groove 36 is provided with a dirt collecting duct 38 which enters the groove tangentially adjacent the upper end thereof. The duct 38 is of a rather small diameter, preferably something less than 25% of the area of the main outlet 34. The diameter of the duct 38, however, is sufficiently great to permit passage therethrough of dirt particles of usual size as found in internal combustion engines, said particles normally being carbon, metal chips, etc.

In the operation of the separator, the main portion of the oil, which has been centrifugally cleaned, will pass through the outlet 34 while the dirt particles, which have been separated and circulated into the groove 36, will pass upwardly therein and finally be collected and removed through the duct 38.

Figure 4:
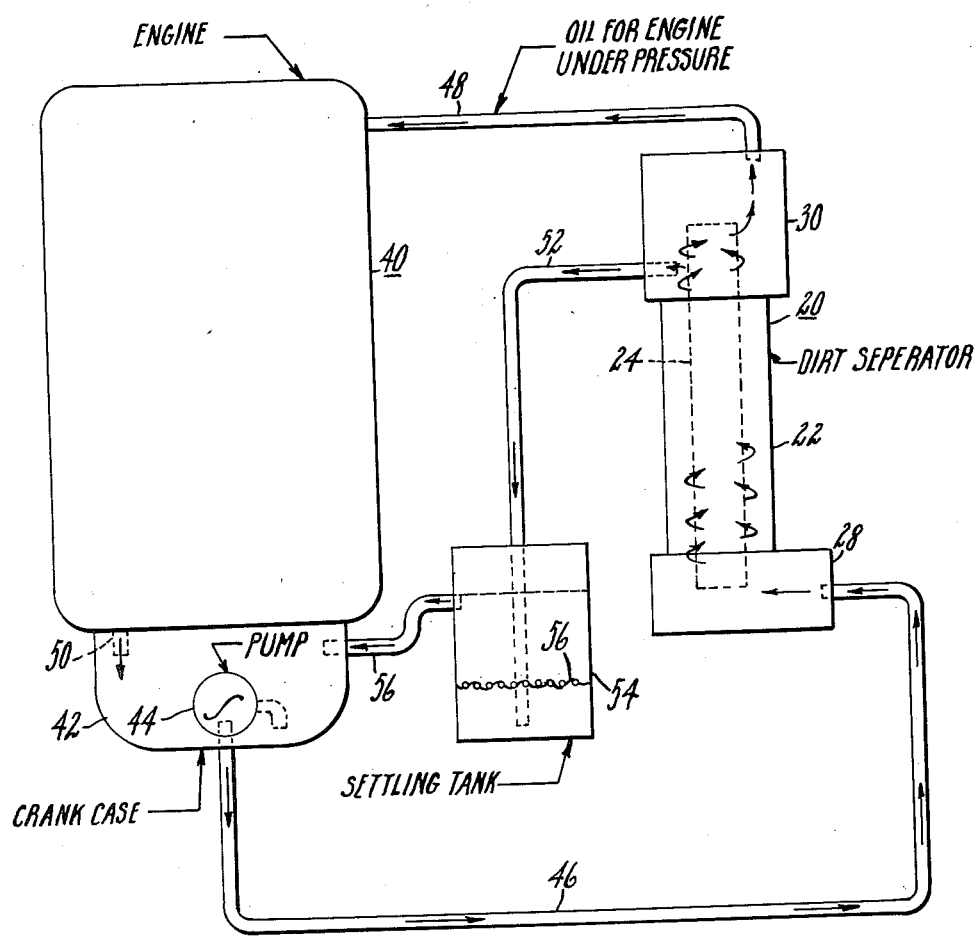
Fig. 4 is a diagrammatic view showing the separator in operative connection with an internal combustion engine.

In Fig. 4, a diagrammatic view is shown of a complete setup wherein the separator 20 is connected to an internal combustion engine 40 which includes a crankcase 42 having an oil pump 44 therein which takes oil from the crankcase and pumps it under pressure through the line 46 into the separator 20 where it is cleaned and where the clean oil emerges into line 48 and passes through the engine 40 to lubricate the same. The return of this oil is obtained through line 50 which opens into the crankcase whereupon the entire procedure is reinitiated through the pump 44 to cause a constant flow in the system.

The particles of dirt together with a small portion of the oil pass off through the line 52 into a settling tank 54 preferably having a screen 56 therein to prevent the dirt from mixing with the remainder of the oil in the settling tank 54. After the setup has been in operation for a period of time, the settling tank 54 fills with oil and the dirt mixed with additional oil which is constantly fed therein, is held beneath the screen 56. As the oil fills tank 54, it drains by gravity through the line 56 back into the crankcase. In this manner, the dirt particles are segregated and held in the settling tank while the oil vehicle which carries them into the tank is separated therefrom by decantation and returned to the crankcase. It will thus be noted that the separator 20 is of the full flow type and has passages therethrough in all cases as large or larger in cross sectional area of the main oil lines.

If, for any reason, the dirt collector duct 38 should become clogged due to a large particle of dirt coming therein, the flow of oil to the engine is in no way impeded. The only action which takes place is that the separator does not function to remove dirt. Thus in an extreme case, if the separator does become clogged, there is no chance of harming the engine due to starvation from oil as would be the case in a filter type of separator, in the present instance, it merely being necessary to disconnect a compression fitting and to clean the duct 38 for continued operation.

The present separator has proved to be very efficient. It has no moving parts to wear out, it has no filter elements to be cleaned and replaced and, in actual test, it has been found that oil recirculated therethrough from 4 to 6 times is completely cleaned by extraneous particles of dirt.

It should be pointed out here that the cross section of the groove 36 and the disposition of the duct 38 are of prime importance to the operation of the device. The duct 38 must come over the groove 36 tangentially with a sharp orifice. This design eliminates turbulence in the oil since the particles of dirt pass smoothly into the orifice and through the duct. If this is not so, turbulence occurs at this point and causes the dirt particles to leave the groove and again mix with the oil, thereby reducing the efficiency of the unit. There should be no restriction in the line from the orifice to the settling tank since it is important that the oil with the dirt therein pass through the orifice immediately upon impingement therewith. Thus the orifice should have a sharp edge, preferably at right angles to the flow of the oil, which is accomplished by a tangential entry at the root of the groove.

While the embodiments of the present invention as herein disclosed, constitute preferred forms, it is to be understood that other forms might be adopted.

What is claimed is as follows:

1. A full flow mechanical separator for removing particles of matter from dirt laden oil and the like, comprising in combination; an elongate body portion including a stationary open annular passage therein having an inlet adjacent the lower end thereof through which dirty oil is introduced under pressure and an outlet adjacent the upper end thereof, said passage having an upwardly extending spiral groove at the outer wall thereof commencing near the inlet and spiralling toward the outlet, said groove opening into said passage and having a cross section wherein the root portion of the groove is of less dimension than the open portion thereof, and a dirt collector positioned adjacent the upper end of the groove and between the groove and the outlet of the passage, consisting of a tangentially disposed duct terminating in the root of said groove, said duct being less than 25% of the cross sectional area of the outlet, whereby particles pass through the duct together with a minor portion of the oil and whereby the major portion of the oil passes through said outlet.

2. The apparatus as claimed in claim 1, wherein the groove has a substantially triangular cross section with the apex of the triangle being disposed at the root of the groove.

3. A full flow separator for removing particles of matter from the dirt laden oil and the like, comprising in combination, a body including a stationary elongate open annular passage therein having an inlet and an outlet adjacent the lower and upper ends of the passage respectively, a centrifugally operated dirt collector within the passage consisting of an open spiral groove extending substantially throughout the length of the passage and disposed in the outer wall thereof, said groove having a root diameter of less cross sectional area than the base diameter thereof, and having an outlet adjacent the upper end of the groove which is directed tangentially into the root of the groove, wherein said outlet is less in cross sectional area than the main outlet of the passage.

4. The device as claimed in claim 3, wherein the groove is of triangular cross section and wherein the root diameter of the groove forms the apex of the triangle.

5. A full flow separator for removing particles of matter from a liquid vehicle, comprising in combination, a body including a stationary elongate open annular passage therein having an inlet and an outlet adjacent the lower and upper ends of the passage respectively, a centrifugally operated dirt collector within the passage consisting of an open spiral groove extending substantially throughout the length of the passage and disposed in the outer wall thereof, said groove having a root diameter of less cross sectional area than the base diameter thereof, and having an outlet adjacent the upper end of the groove which is directed tangentially into the groove which is directed tangentially into the root of the groove, wherein said outlet has a cross sectional area of not more than 25% of the cross sectional area of the main outlet.

6. A full flow mechanical separator for removing particles of matter from dirt laden oil and the like, comprising in combination; an elongate body portion including a stationary open annular passage therethrough having an inlet adjacent the lower end thereof through which dirty oil is introduced under pressure and an outlet adjacent the upper end thereof, said passage having an upwardly extending open spiral groove in the outer wall thereof commencing near the inlet and spiralling toward the outlet, said groove having a cross section wherein the root portion of the groove is of less dimension than the open portion thereof, and a collecting means positioned adjacent the upper end of the groove and before the outlet of the passage, consisting of a tangentially disposed duct terminating in the root of said groove, said duct being less than 25% of the cross sectional area of the outlet, whereby solid particles of dirt pass through the duct together with a minor portion of the oil and whereby the major portion of the oil passes through said outlet, the length and pitch of said spiral groove, the width of the passage and the diameter of the collecting means being so calculated in comparison to the estimated oil pressure, that an average size particle of dirt approximating the density of metal will have sufficient time to migrate centrifugally from the inner diameter of the passage to the root diameter of the groove during the time that it remains in the passage.

References Cited in the file of this patent

UNITED STATES PATENTS

| Number | Name | Date |
| --- | --- | --- |
| 1,747,155 | Birdsall | Feb. 18, 1930 |
| 1,880,185 | Kerns et al. | Sept. 27, 1932 |
| 1,921,689 | Meurk | Aug. 8, 1933 |
| 2,426,327 | Underwood | Aug. 26, 1947 |
| 2,515,398 | Derocher | July 18, 1950 |